United States Patent
Agarwal et al.

(10) Patent No.: US 10,394,824 B2
(45) Date of Patent: *Aug. 27, 2019

(54) PROVIDING RESULTS TO PARAMETERLESS SEARCH QUERIES

(71) Applicant: Google LLC, Mountain View, CA (US)

(72) Inventors: Sumit Agarwal, Washington, DC (US); Vivek Paul Gundotra, Los Galtos, CA (US); Alexander Nicolaou, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/499,553

(22) Filed: Apr. 27, 2017

(65) Prior Publication Data
US 2017/0228436 A1 Aug. 10, 2017

Related U.S. Application Data

(63) Continuation of application No. 14/865,670, filed on Sep. 25, 2015, now Pat. No. 9,665,652, which is a (Continued)

(51) Int. Cl.
*G06F 17/30* (2006.01)
*G06F 16/2457* (2019.01)
(Continued)

(52) U.S. Cl.
CPC ........ *G06F 16/24575* (2019.01); *G01C 21/20* (2013.01); *G01C 21/3691* (2013.01);
(Continued)

(58) Field of Classification Search
CPC ......... G06F 17/30528; G06F 17/30241; G06F 17/30522; G06F 17/3053; G06F 17/30554;
(Continued)

(56) References Cited

U.S. PATENT DOCUMENTS 7,548,915 B2  6/2009  Ramer et al.
7,603,349 B1  10/2009  Kraft et al.
(Continued)

FOREIGN PATENT DOCUMENTS

KR  20020047808 A  6/2002
KR  20090033989 A  4/2009
(Continued)

OTHER PUBLICATIONS

Chen, et al., "A Survey of Context-Aware Mobile Computing Research," Dartmouth Computer Science Technical Report TR2000-381, Dartmouth College; Department of Computer Science, 2000, 16 pp.

(Continued)

*Primary Examiner* — Gertrude Arthur Jeanglaude
(74) *Attorney, Agent, or Firm* — Middleton Reutlinger

(57) ABSTRACT

In one implementation, a computer-implemented method includes receiving a parameterless search request, which was provided to a mobile computing device, for information that is relevant to a user of the mobile computing device. The method also includes, in response to the received parameterless search request, identifying with a digital computer system one or more results that are determined to be relevant to the user of the mobile computing device based upon a current context of the mobile computing device. The method further includes providing the results for display to a user of the mobile computing device.

20 Claims, 6 Drawing Sheets

Related U.S. Application Data continuation of application No. 14/270,902, filed on May 6, 2014, now Pat. No. 9,146,964, which is a continuation of application No. 13/959,680, filed on Aug. 5, 2013, now Pat. No. 9,212,915, which is a continuation of application No. 13/249,164, filed on Sep. 29, 2011, now Pat. No. 8,504,286, which is a continuation of application No. 12/871,562, filed on Aug. 30, 2010, now Pat. No. 8,478,519.

(51) Int. Cl.
 *G06F 16/29* (2019.01)
 *G06F 16/248* (2019.01)
 *G06F 16/903* (2019.01)
 *G06F 16/9535* (2019.01)
 *G06F 16/9537* (2019.01)
 *G01C 21/20* (2006.01)
 *G01C 21/36* (2006.01)

(52) U.S. Cl.
 CPC ........ *G06F 16/248* (2019.01); *G06F 16/2457* (2019.01); *G06F 16/24578* (2019.01); *G06F 16/29* (2019.01); *G06F 16/903* (2019.01); *G06F 16/9535* (2019.01); *G06F 16/9537* (2019.01)

(58) Field of Classification Search
 CPC ........... G06F 17/30867; G06F 17/3087; G06F 17/30964; G01C 21/20; G01C 21/3691
 USPC ......................................................... 701/414
 See application file for complete search history.

(56) References Cited

U.S. PATENT DOCUMENTS

| | | | |
|---|---|---|---|
| 7,813,870 | B2 | 10/2010 | Downs et al. |
| 7,865,181 | B1 | 1/2011 | Macaluso |
| 8,027,879 | B2 | 9/2011 | Ramer et al. |
| 8,156,128 | B2 | 4/2012 | Ramer et al. |
| 8,229,914 | B2 | 7/2012 | Ramer et al. |
| 8,478,519 | B2 | 7/2013 | Agarwal et al. |
| 8,504,286 | B2 | 8/2013 | Agarwal et al. |
| 9,146,964 | B2 | 9/2015 | Agarwal et al. |
| 9,212,915 | B2 | 12/2015 | Agarwal et al. |
| 9,665,652 | B2 * | 5/2017 | Agarwal ............... G01C 21/20 |
| 2004/0267730 | A1 | 12/2004 | Dumais et al. |
| 2007/0061198 | A1 | 3/2007 | Ramer et al. |
| 2007/0061243 | A1 | 3/2007 | Ramer et al. |
| 2007/0061245 | A1 | 3/2007 | Ramer et al. |
| 2007/0061303 | A1 | 3/2007 | Ramer et al. |
| 2007/0073717 | A1 | 3/2007 | Ramer et al. |
| 2007/0073719 | A1 | 3/2007 | Ramer et al. |
| 2007/0073722 | A1 | 3/2007 | Ramer et al. |
| 2007/0100650 | A1 | 5/2007 | Ramer et al. |
| 2007/0100652 | A1 | 5/2007 | Ramer et al. |
| 2007/0100805 | A1 | 5/2007 | Ramer et al. |
| 2007/0118533 | A1 | 5/2007 | Ramer et al. |
| 2007/0150362 | A1 | 6/2007 | Sharma et al. |
| 2007/0192294 | A1 | 8/2007 | Ramer et al. |
| 2007/0198485 | A1 | 8/2007 | Ramer et al. |
| 2007/0198505 | A1 | 8/2007 | Fuller |
| 2007/0208492 | A1 | 9/2007 | Downs et al. |
| 2007/0288427 | A1 | 12/2007 | Ramer et al. |
| 2008/0005067 | A1 | 1/2008 | Dumais et al. |
| 2008/0214148 | A1 | 9/2008 | Ramer et al. |
| 2008/0214150 | A1 | 9/2008 | Ramer et al. |
| 2008/0214152 | A1 | 9/2008 | Ramer et al. |
| 2008/0214156 | A1 | 9/2008 | Ramer et al. |
| 2008/0214162 | A1 | 9/2008 | Ramer et al. |
| 2008/0214166 | A1 | 9/2008 | Ramer et al. |
| 2008/0215428 | A1 | 9/2008 | Ramer et al. |
| 2008/0215475 | A1 | 9/2008 | Ramer et al. |
| 2008/0215623 | A1 | 9/2008 | Ramer et al. |
| 2008/0242279 | A1 | 10/2008 | Ramer et al. |
| 2008/0256044 | A1 | 10/2008 | Anderson et al. |
| 2009/0125499 | A1 | 5/2009 | Cross et al. |
| 2009/0144260 | A1 | 6/2009 | Bennett et al. |
| 2009/0222329 | A1 | 9/2009 | Ramer et al. |
| 2009/0234711 | A1 | 9/2009 | Ramer et al. |
| 2009/0234745 | A1 | 9/2009 | Ramer et al. |
| 2009/0234861 | A1 | 9/2009 | Ramer et al. |
| 2009/0240569 | A1 | 9/2009 | Ramer et al. |
| 2009/0240586 | A1 | 9/2009 | Ramer et al. |
| 2009/0265470 | A1 | 10/2009 | Shen et al. |
| 2009/0319348 | A1 | 12/2009 | Khosravy et al. |
| 2010/0005061 | A1 | 1/2010 | Basco et al. |
| 2010/0063877 | A1 | 3/2010 | Soroca et al. |
| 2010/0076845 | A1 | 3/2010 | Ramer et al. |
| 2010/0076994 | A1 | 3/2010 | Soroca et al. |
| 2010/0082431 | A1 | 4/2010 | Ramer et al. |
| 2010/0094878 | A1 | 4/2010 | Soroca et al. |
| 2010/0120450 | A1 | 5/2010 | Herz |
| 2010/0153211 | A1 | 6/2010 | Ramer et al. |
| 2010/0153453 | A1 | 6/2010 | Knowles |
| 2010/0217663 | A1 | 8/2010 | Ramer et al. |
| 2010/0287048 | A1 | 11/2010 | Ramer et al. |
| 2010/0312572 | A1 | 12/2010 | Ramer et al. |
| 2011/0105095 | A1 | 5/2011 | Kedefors et al. |
| 2011/0137881 | A1 | 6/2011 | Cheng et al. |
| 2011/0145076 | A1 | 6/2011 | Ramer et al. |
| 2011/0153428 | A1 | 6/2011 | Ramer et al. |
| 2011/0202874 | A1 | 8/2011 | Ramer et al. |
| 2011/0258049 | A1 | 10/2011 | Ramer et al. |

FOREIGN PATENT DOCUMENTS

| | | |
|---|---|---|
| KR | 1020100052378 A | 5/2010 |
| WO | 2010048448 A2 | 4/2010 |
| WO | 2011153079 A2 | 12/2011 |

OTHER PUBLICATIONS

EKMSystems, "ekmCompass public release: redirect your visitors to the most relevant website based on their geographic location," Dec. 10, 2008, retrieved on Jul. 2, 2009 from http://www.ekmsystems.co.uk/news/44/ekmcompass-public-release-redirect-your-visitors-to-the-most-relevant-website-based, 1 pp.

Doris, "Shake to Delete," 2009, retrieved on Nov. 9, 2011, from http://beta.dorisapp.com/blog/2009/04/29/shake-to-delete, 2 pp.

Patently Apple, "Apple Reveals a Powerful Location-Based Service for the iPhone," 2010, retrieved on Nov. 24, 2010, from http//www.patentlyapple.com/patently-apple/2010/05/apple-reveals-a-powerful-location-based-service-for-the-iphone.html, 5 pp.

First Examination Report from counterpart Australian Patent Application No. 2014203476, dated Jun. 9, 2015, 3 pp.

Google Mobile, "Google Maps with my Location (Beta)," 2011, retrieved on May 5, 2010 from http://www.google.com/mobile/gmm/mylocation/index.html, 2 pp.

Google, "Google Search: Minneapolis Jimmy Johns," retrieved on May 5, 2010, from http://www.google.com/search?hl=en&source=hp&q=minneapolis+jimmy+johns&aq=f&aq, 2 pp.

StackOverflow, "How to Use Shake API in iPhone SDK 3.0?," 2009, retrieved on Nov. 9, 2011 from http://stackoverflow.com/questions/1170917/how-to-use-shake-api-in-iphone-sdk-3-0, 3 pp.

Seattle Pi, "Shake Your iPhone, Find a Restaurant," 2008, retrieved on Nov. 9, 2011 from http://blog.seattlepi.com/venture/2008/06/11/shake-your-iphone-find-a-restaurant, 3 pp.

Wireless Networking in the Developing World, "Captive Portals," 2007, retrieved on May 5, 2010 from http://www.visa.org/wirelessnetw/wndw_08_04_04.html, 3 pp.

U.S. Appl. No. 14/505,127, by Sumit Agarwal, filed Oct. 2, 2014.

Office Action from Korean Application No. 10-2013-7008209, dated Apr. 17, 2014, 9 pp.

Office Action from Korea Patent Application No. 10-2013-7008209, dated Nov. 25, 2014 6 pp.

Office Action from Korea Patent Application No. 10-2014-7020072, dated Oct. 8, 2014, 11 pp.

(56) References Cited

OTHER PUBLICATIONS

Patent Examination Report No. 1 of counterpart Australian Application No. 2011296121, dated Jan. 8, 2014, 3 pp.
Prosecution History from U.S. Pat. No. 8,478,519, dated Nov. 23, 2011 through May 4, 2013, 84 pp.
Prosecution History from U.S. Pat. No. 8,504,286, dated Nov. 22, 2011 through Apr. 2, 2013, 74 pp.
Prosecution History from U.S. Pat. No. 9,212,915, dated Sep. 19, 2013 through May 20, 2014, 18 pp.
Prosecution History from U.S. Pat. No. 9,126,964, dated Feb. 26, 2015 through Jul. 22, 2015, 24 pp.
International Search Report and Written Opinion in International Application No. PCT/US2010/058222, dated Jul. 12, 2011, 8 pp.
International Search Report and Written Opinion in International Application No. PCT/US2011/049685, dated Mar. 7, 2012, 7 pp.
Prosecution History from U.S. Pat. No. 9,665,652, dated Oct. 20, 2016 through Jan. 27, 2017, 14 pp.
Search Report from European Application No. 11822471.6, dated Oct. 18, 2017, 7 pp.
European Patent Office; Intention to Grant issued in Application No. 11822471.6 dated Mar. 18, 2019.

* cited by examiner

PROVIDING RESULTS TO PARAMETERLESS SEARCH QUERIES

CROSS-REFERENCE TO RELATED APPLICATIONS

This application is a continuation of and claims priority under 35 U.S.C. § 120 to U.S. application Ser. No. 14/865,670, filed Sep. 25, 2015, which is a continuation of and claims priority to U.S. application Ser. No. 14/270,902, filed May 6, 2014, issued as U.S. Pat. No. 9,146,964 on Sep. 29, 2015, which is a continuation of and claims priority to U.S. application Ser. No. 13/959,680, filed on Aug. 5, 2013, issued as U.S. Pat. No. 9,212,915 on Dec. 15, 2015, which is a continuation of and claims priority to U.S. application Ser. No. 13/249,164, filed on Sep. 29, 2011, issued as U.S. Pat. No. 8,504,286 on Aug. 6, 2013, which is a continuation of and claims priority to U.S. application Ser. No. 12/871,562, filed on Aug. 30, 2010, issued as U.S. Pat. No. 8,478,519 on Jul. 2, 2013, the entire contents of each of which are hereby incorporated by reference.

TECHNICAL FIELD

This document generally describes techniques, method, systems, and mechanisms for providing results to parameterless search queries on a mobile computing device, such as a mobile telephone.

BACKGROUND

Mobile computing devices (e.g., mobile telephones, smart telephones, personal digital assistants (PDAs), portable media players, etc.) have been configured to provide results to a user in response to search queries with parameters. For example, a user can submit a search query for directions to a nearby pizzeria to a mobile computing device. In such an example, parameters of the search query include (a) the portion of the request identifying directions as the desired result, and (b) the indication that a nearby pizzeria is the topic of the query. In response, the mobile computing device can (alone, or in combination with a remote server system) identify a nearby pizzeria and provide directions to the pizzeria to the user. Such mobile computing devices have been configured to receive a search query as text-based input (e.g., a query typed using keys), selection-based input (e.g., touchscreen selection, etc.), and audio-based input (e.g., voice input).

SUMMARY

This document describes techniques, methods, and systems for providing results to a parameterless search query on a mobile computing device (e.g., a cellular telephone, smart telephone, a PDA, a portable media player, etc.). A parameterless search query is a search query that queries a mobile computing device for information that is relevant to a user, but where the user does not provide any parameters to further specify what is relevant to the user at a given time. Instead, a parameterless search query puts on the mobile computing device the onus of determining what the user is likely to deem relevant. To provide an indication of relevance to a user, a mobile computing device can examine a current context within which the mobile computing device and/or the user of the mobile computing device exist at the time the parameterless search query is received (which, as discussed here, can occur by the computing device acting on its own or in combination with a computer server system).

For example, assume that a mobile computing device is moving with a user on a highway who is travelling at speed during rush hour on a workday (e.g., Monday-Friday). If the user submits a parameterless search query to the mobile computing device, the device can examine its current context (travelling on the highway during rush hour) and infer that the user would like to receive traffic information for the stretch of highway ahead. The mobile computing device can infer parameters for the search query (e.g., traffic conditions and highway number), identify results for the search query (e.g., expect to encounter stop-and-go traffic in two miles), and provide the results to the user (e.g., activate a speaker on the mobile device and audibly transmit the traffic conditions to the user).

In one implementation, a computer-implemented method includes receiving a parameterless search request, which was provided to a mobile computing device, for information that is relevant to a user of the mobile computing device. The method also includes, in response to the received parameterless search request, identifying with a digital computer system one or more results that are determined to be relevant to the user of the mobile computing device based upon a current context of the mobile computing device. The method further includes providing the results for display to a user of the mobile computing device.

In another implementation, an electronic system for providing results that are relevant to a user includes a mobile computing device and an input subsystem of the mobile computing device that is configured to receive a parameterless search request for information that is relevant to a user of the mobile computing device. The system can further include a result identification unit of the mobile computing device that is configured to, in response to a parameterless search request received by the input subsystem, identify one or more results that are determined to be relevant to the user of the mobile computing device based upon a current context of the mobile computing device. The system can also include an output subsystem of the mobile computing device that is configured to provide the results to the user of the mobile computing device.

In another implementation, an electronic system for providing results that are relevant to a user includes a mobile computing device and an input subsystem of the mobile computing device that is configured to receive a parameterless search request for information that is relevant to a user of the mobile computing device. The system can also include means for identifying, in response to a parameterless search request received by the input subsystem, one or more results that are determined to be relevant to the user of the mobile computing device based upon a current context of the mobile computing device. The system can further include an output subsystem of the mobile computing device that is configured to provide the results to the user of the mobile computing device.

The details of one or more embodiments are set forth in the accompanying drawings and the description below. Various advantages can be realized with certain implementations, such as providing information that is relevant to a user of a mobile computing device based upon minimal input from the user. Given that it can be tedious and time consuming to provide input to a mobile computing device (e.g., typing on a smaller keyboard/screen), minimizing the time it takes for a user to receive relevant information can save the user time. Additionally, users of a mobile computing device may want to submit a search query to a mobile computing device while they are occupied with another task that makes providing the input impractical or unsafe, such as driving a car. In such situations, a user can provide a simple input (e.g., press a button on the mobile device, shake the mobile device, etc.) that allows the user to receive relevant information without requiring the user to exhibit impractical or unsafe behavior.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
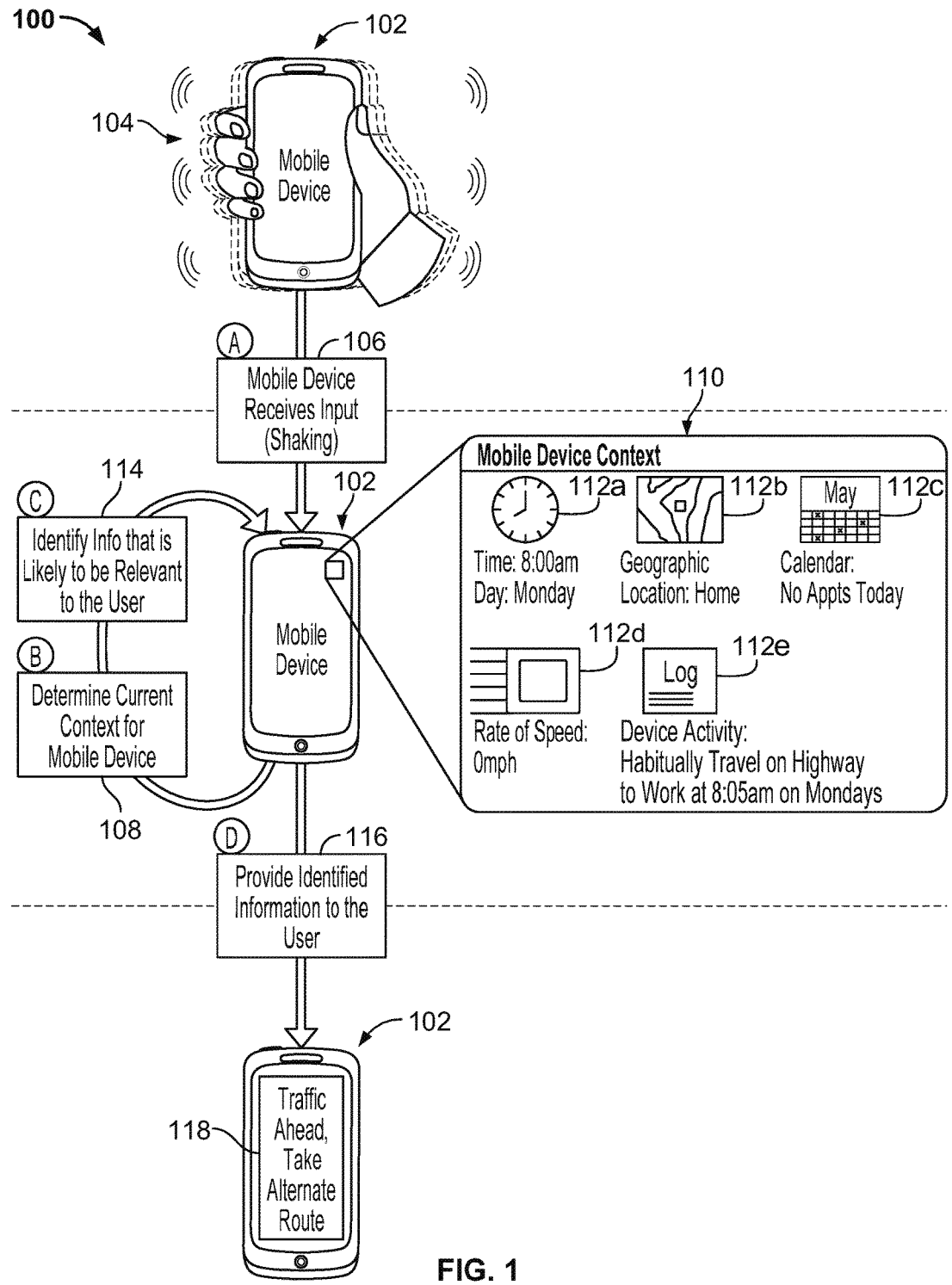
FIG. 1 is a conceptual diagram of an example mobile computing device for providing results to parameterless search queries.

This document describes techniques, method, systems, and mechanisms for providing results to a parameterless search query on a mobile computing device (e.g., mobile telephone, smart telephone (e.g., IPHONE, BLACKBERRY), personal digital assistant (PDA), portable media player (e.g., IPOD), etc.). A parameterless search query is a search query that does not contain any parameters for the search query (may also be termed a "zero input" query). Instead, a parameterless search query asks the mobile computing device to infer what a user of the mobile computing device wants to know (infer the parameters for the search query) based upon a current context for the mobile computing device (e.g., time of day, geographic location, calendar appointments, etc.).

As the features provided by mobile computing devices have increased, users have become more reliant on mobile computing devices as a source of relevant information. For instance, mobile computing devices can provide a user with access to the user's email, the user's electronic calendar (e.g., meetings, appointments, reminders, etc.), up-to-date traffic information, driving directions, location-based searching (e.g., search for hotel near current location), etc.

However, depending on the user interface (UI) for a mobile computing device, it can often take several steps for a user to provide a search query with parameters to a mobile computing device to locate information that is relevant to the user. For example, if a user would like to quickly locate a nearby restaurant, the user may have to navigate through a variety of menus on the mobile computing device to reach a location-based search interface (e.g., interface for a map application) and then may have to type out parameters for the query (e.g., "restaurant," "near current location").

With parameterless search queries, a user can obtain the information they are interested in without having to provide a formulated search query. Instead, using a parameterless search query, a user can access the information he/she is interested in by merely providing input to the mobile computing device that indicates a request for a parameterless search query. Such input can be simple and easy for a user to perform, such as shaking the mobile computing device a set number of times (e.g., shake one time, shake two times, etc.), pressing a button on the mobile computing device for a period of time (e.g., press and hold button for two seconds), providing a verbal command to the mobile computing device (e.g., commanding the device to "search now"), etc.

In response to receiving input indicating a request for a parameterless search query, a mobile computing device can infer parameters for the search query based upon a current context for the mobile device. A current context for a mobile computing device can include a variety of information associated with the mobile computing device and/or a user of the mobile computing device, such as the time of day and date (e.g., 2:00 pm on May 29, 2010), upcoming and/or recent calendar appointments (e.g., meeting with John at 2:30 pm on May 29, 2010), a direction and rate of speed at which the device is travelling (e.g., northbound at 20 miles per hour), a current geographic location (e.g., on the corner of 10th Street and Marquette Avenue), recent device activity (e.g., emails sent to John regarding the 2:30 meeting), etc.

Using a current context, a mobile computing device can infer parameters for a user's parameterless search query (infer what the user wants to know), perform a search using the inferred parameters, and provide results to the user. For example, if the current context for a mobile computing device includes the mobile device being geographically located on a highway and travelling at speed of 55 miles per hour, the mobile device may infer that the user would like to know current traffic conditions for the surrounding area. The mobile computing device can perform a search query for traffic conditions near the device's geographic location and provide the results to the user (e.g., display a map with roads that are color-coded according to traffic conditions, provide the user with a list of expected delay times for various roads nearby, etc.).

In another example, if the current context for the mobile computing device includes the current time and date being 10:05 am on November 3, and a user of the mobile device having a conference call scheduled in his/her electronic calendar scheduled for 10:00 am on November 3 (the user is 5 minutes late for the conference call), the mobile computing device can infer that the user would like to access information for the conference call (e.g., the telephone number for the conference call). The mobile computing device can perform a search query for information related to the conference call and provide the results to the user (e.g., display a telephone number for the conference call to the user and provide an option to automatically initiate a telephone call to the telephone number).

As described in further detail below, a mobile computing device can perform a parameterless search query locally on the mobile computing device (e.g., search data stored locally on the mobile computing device) and/or in conjunction with a computer system that is remote to the mobile computing device (e.g., provide search query over a network to a remote server system). For example, a mobile computing device can determine its current context, infer parameters for a parameterless search request, and identify and provide results as a standalone device (e.g., without interacting with other devices over a network). Results for parameterless search queries can be provided to a user in various manners, such as visually on a display for the mobile device, audibly through a speaker system of the mobile computing device, etc.

FIG. 1 is a conceptual diagram 100 of an example mobile computing device 102 for providing results to parameterless search queries. The example diagram 100 provides an illustrative example of the mobile computing device 102 receiving input that indicates a request for a parameterless search query, inferring parameters for the search query based upon a current context for the device, and providing results for the search query to a user.

In the example diagram 100, a user is depicted as holding the mobile computing device 102 in his/her hand and shaking 104 the mobile computing device 102. In this example, the mobile computing device 102 is configured to recognize the shaking 104 as input that indicates a request for a parameterless search query. The mobile computing device 102 can be configured to recognize additional (or other) user interactions with mobile computing device 102 as input that indicates a request for a parameterless search query.

Using one or more sensors that are configured to measure movement (e.g., accelerometers, gyroscopes, etc.), the mobile computing device 102 receives input 106 from the one or more sensors that indicates that the user shook the device 102.

As indicated above, in this example the mobile computing device 102 is configured to recognize the input 106 as a request to perform a parameterless search query. In response to the input 106 indicating the user shook 104 the mobile device 102, and without additional input further providing parameters for the search query (further indicating what the user would like to know), the mobile computing device 102 begins performing a parameterless search query by determining a current context for the mobile device and/or for the user of the mobile device (108).

The current context includes information that describes the present state and/or surroundings of the mobile computing device 102 and/or the user of the mobile computing device at the time the input 106 is received. For instance, the current context can include a variety of information related to the mobile computing device 102 and the user, such as information regarding the surrounding physical environment (e.g., geographic location, weather conditions, nearby businesses, volume of ambient noise, level of ambient light, image captured by the mobile device's camera, etc.), the present state of the mobile computing device 102 (e.g., rate of speed, touchscreen input activated, audio input activated, ringer on/off, etc.), time and date information (e.g., time of day, date, calendar appointments, day of the week, etc.), user activity (e.g., recent user activity, habitual user activity), etc. The current context can be determined by the mobile computing device 102 using data and sensors that are local and/or remote to the mobile computing device 102.

As indicated by the example context 110 for the mobile device, the current context for the mobile computing device includes time/date information 112a, geographic location information 112b, calendar information 112c, rate of speed information 112d, and device activity information 112e. In the depicted example, the time/date information 112a lists the time as 8:00 am on a Monday and the geographic information 112b provides that the mobile computing device 102 is currently located at the user's home. The calendar information 112c provides that the user has no appointments scheduled for the day and the rate of speed information 112d indicates that the mobile computing device 102 is currently stationary (travelling at 0 miles per hour). The device activity information 112e indicates that the device habitually travels on a highway at a high rate of speed to the user's work at 8:05 am on Mondays.

Based upon this example context 110, the mobile computing device 102 can identify information that is likely to be relevant to the user (114). Given that the device 102 is located at the user's home, the current time is 8:00 am on a Monday, the device is currently stationary, and the device typically travels along a highway to the user's work at 8:05 am on Mondays, the mobile computing device 102 can determine that the user is likely to drive from the user's home to the user's work in the near future. Based upon this determination, the mobile computing can infer parameters for the parameterless search query related to driving to the user's work. Since the user has travelled from his/her home to work in the past, as indicated by the device activity information 112e, the mobile computing device 102 can determine that it is unlikely that the user would like to receive driving directions from the user's home to work. Instead, the mobile computing device 102 can infer that the user is likely interested in knowing the current traffic conditions for the user's morning commute to work and can select parameters accordingly (e.g., select parameters "traffic" and "from current location to work location").

Were the context 110 to be changed slightly, the mobile computing device 102 may infer the user is interested in different information. For example, were the user to have a meeting scheduled for 8:30 am out of the office, the mobile computing device 102 may infer that the user would like driving directions to the meeting location and/or information regarding the meeting (e.g., time, subject, participants, etc.). In another example, were the user to have viewed a developing news story using an application (e.g., web browser, news application) on the mobile computing device 102 at 7:30 am, the mobile computing device 102 may infer that the user would like to know if there have been any recent updates to the news story.

The mobile computing device 102 may infer the user is interested in more than one piece of information and may generate parameters for more than one search query. For instance, the mobile computing device 102 may infer that the user wants to know about traffic conditions for the user's work commute and know about updates to the developing news story the user viewed earlier in the morning. The mobile computing device 102 can generate parameters and provide information to the user related to both items identified as being of potential interest to the user.

Having inferred what the user would like to know and selected parameters based upon the current context 110, the mobile computing device 102 can identify information that is likely to be relevant to the user with the selected parameters. The mobile computing device 102 can use various search-related services that are provided locally and/or remotely to obtain the sought-after information. For example, the mobile computing device 102 may query a real-time traffic server system provided by a department of transportation for traffic information. In another example, the mobile computing device 102 may query an application installed on the mobile computing device 102 that is configured to obtain traffic information over traffic message channel (TMC) radio frequency. In a further example, the mobile computing device 102 can search traffic information cached locally on the mobile computing device 102. The mobile computing device 102 is capable of determining its current context and serving parameterless search requests by itself (e.g., without interacting with other computing devices and/or services over a network).

Having obtained the traffic information for the user's route to work, the mobile computing device can provide the identified information to the user (116). For example, the mobile computing device can present a message 118 that indicates the current traffic conditions and, if they are unfavorable, suggest that the user take an alternate route. The identified information can be provided by the mobile computing device 102 to the user in a variety of manners. For example, in addition to providing the user with a visual message, the mobile computing device 102 may audibly transmit the message to the user with a speaker system that is attached to and/or part-of the mobile computing device 102.

Figure 2A:
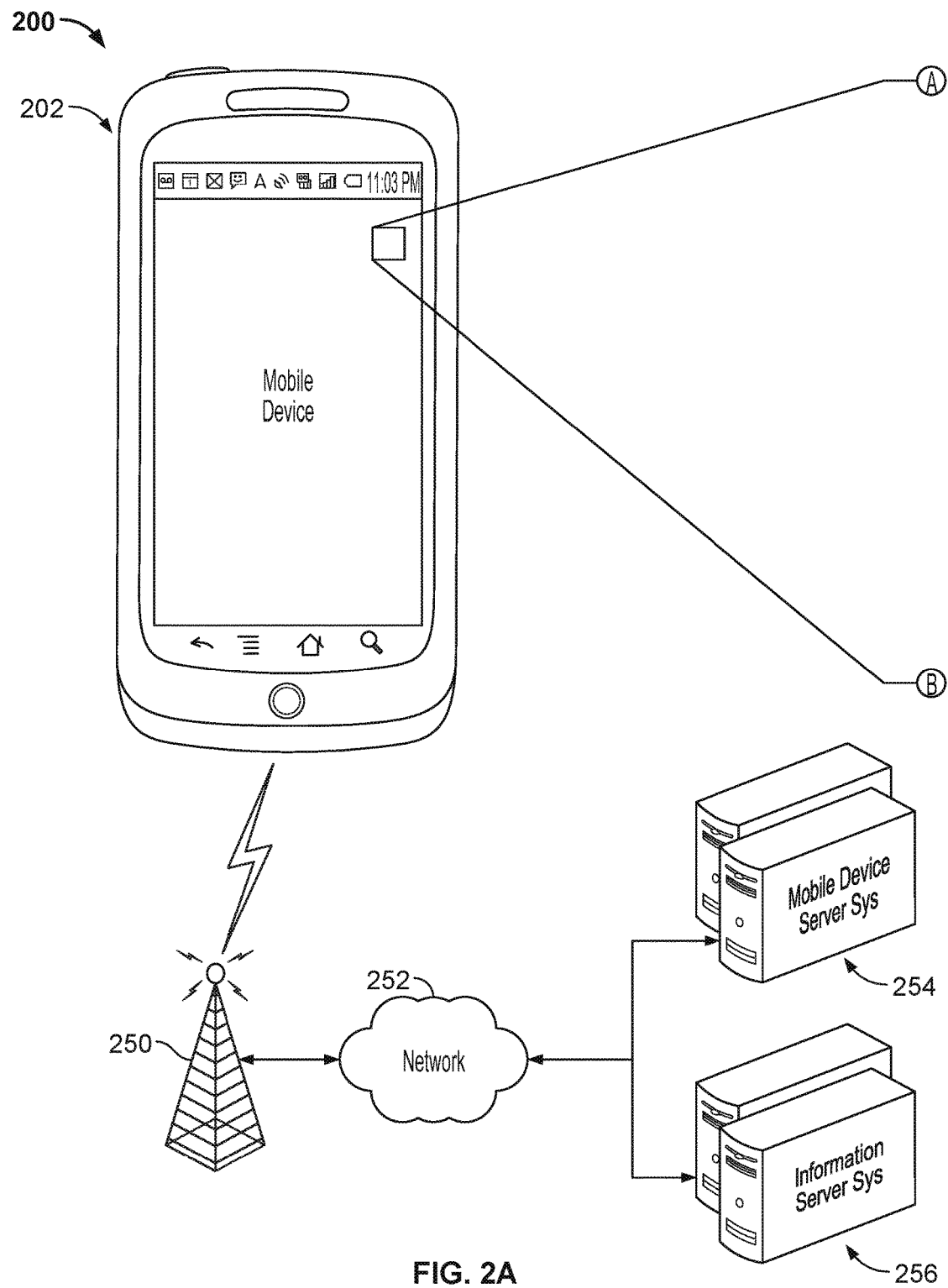
FIGS. 2A-B are diagrams of an example system for providing results to parameterless search queries on a mobile computing device.
Figure 2B:
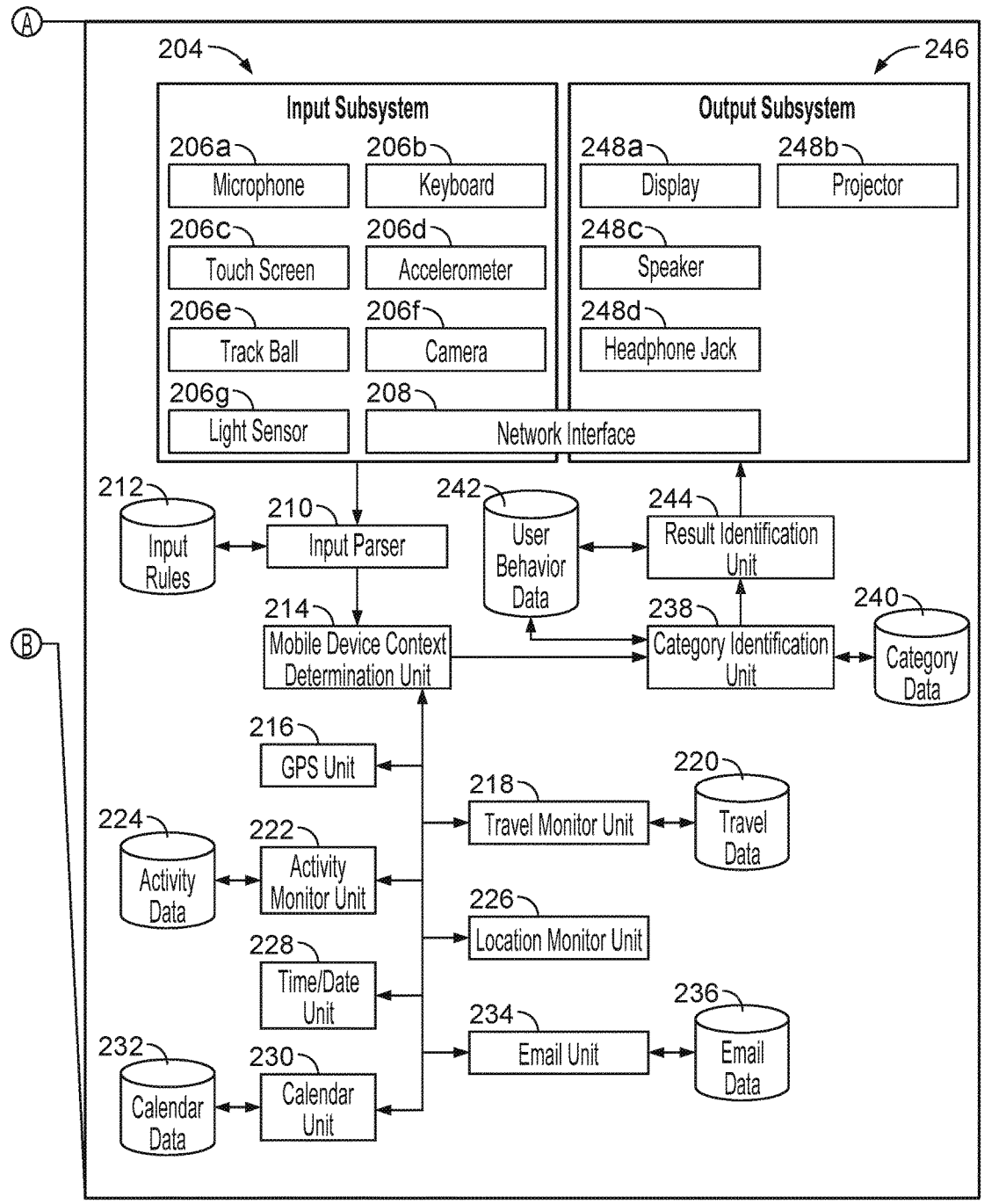

FIGS. 2A-B are diagrams of an example system 200 for providing results to parameterless search queries on an example mobile computing device 202. The mobile computing device 202 can be configured to provide results to a parameterless search query based upon a current context associated with the mobile computing device 202 and/or a user of the mobile computing device, similar to the mobile computing device 102 described above with regard to FIG. 1.

The mobile computing device 202 is depicted as including an input subsystem 204 through which a user of the mobile computing device 202 can provide input that indicates a request for a parameterless search query. Referring to FIG. 2B, the input subsystem 204 is depicted as including a microphone 206a (configured to receive audio-based input), a keyboard 206b (configured to receive key-based input), a touchscreen 206c (configured to receive screen touch-based input), an accelerometer 206d (configured to receive motion-based input), a trackball 206e (configured to receive GUI pointer-based input), a camera 206f (configured to receive visual input), and a light sensor 206g (configured to receive input based on light intensity). The input subsystem 204 also includes a network interface 208 (e.g., wireless network interface, universal serial bus (USB) interface, BLUETOOTH interface, public switched telephone network (PSTN) interface, Ethernet interface, cellular network interface, 3G and/or 4G network interface, etc.) that is configured to receive network-based input and output. Other types of input devices not mentioned may also be part of the input subsystem 204.

An input parser 210 of the mobile computing device 202 can be configured to receive input from the input subsystem 204 (e.g., input events) and determine whether the received input indicates a request for a parameterless search query. The input parser 210 can use input rules 212 to determine whether a particular input indicates a request for a parameterless search query. For instance, the input rules 212 can stipulate that shaking the mobile computing device 202 once indicates an "undo" command (e.g., undo recent typing) and that shaking the device 202 twice indicates a request for a parameterless search query. The input rules 212 can be preconfigured and/or user defined.

In response to the input parser 210 identifying input that indicates a request for a parameterless search query, a mobile device context determination unit 214 can determine a current context for the mobile computing device 202. The mobile device context determination unit 214 can determine a current context for the mobile device 202 using a variety of context monitoring units of the mobile computing device 202.

For instance, a global positioning system (GPS) unit 216 can provide geographic location information to the mobile device context determination unit 214 and a travel monitor unit 218 (in conjunction with a travel data repository 220) can provide information related to a route currently being travelled and habitual routes travelled by the mobile computing device 202. An activity monitor unit 222 (in conjunction with an activity data repository 224) can provide information related to recent and habitual user activity (e.g., applications used, specific information accessed at various times, etc.) on the mobile device 202. A location monitor unit 226 can provide information regarding entities (e.g., businesses, parks, festivals, public transportation, etc.) geographically located near the current geographic location for the mobile device 202. A time and date unit 228 can provide current time and date information and a calendar unit 230 (in conjunction with a calendar data repository 232) can provide information related to appointments for the user. An email unit 234 (in conjunction with an email data repository 236) can provide email-related information (e.g., recent emails sent/received). The mobile context determination unit 214 can receive information from other context monitoring units not mentioned or depicted.

In some implementations, the context monitoring units 216-236 can be implemented in-part, or in-whole, remote from the mobile computing device 202. For example, the email unit 234 may be a thin-client that merely displays email-related data that is maintained and provided by a remote server system. In such an example, the email unit 234 can interact with the remote server system to obtain email-related information to provide to the mobile device context determination unit 214.

A category identification unit 238 can use the current context for the mobile device 202, as determined by the mobile device context determination unit 214, to identify one or more categories of information that the user in which the user is likely to be interested. For example, categories of information identified by the category identification unit 238 may include environmental information (e.g., weather information), travel information (e.g., traffic information, driving directions, transportation schedule information, map information), geographic proximity information (e.g., nearby business information), recently updated information (e.g., real-time news updates, blog updates, email/texting conversation updates), and personal information (e.g., calendar appointments for a user, contact information for a user's acquaintances). Other categories of information not mentioned may be used and identified by the category identification unit 238 in response to a parameterless search query request.

The category identification unit 238 can identify one or more categories of information for the parameterless search query using a category data repository 240, which can define categories of information and provide various contextual factors that may indicate categories of information in which a user is interested (e.g., category-based rules, category scoring techniques, etc.). The category data repository 240 can include predefined data and/or user defined data. The data stored in the category data repository 240 can be subject to change over time as well (e.g., the mobile computing device 202 can "learn" a user's interests in various contexts and adjust the data stored in the category data repository 240 over time).

The category identification unit 238 can additionally use data stored in a user behavior data repository 242 to determine one or more categories of information in which a user is likely to be interested. The user behavior data repository 242 can log previous requests for a parameterless search query, a context for the mobile device 202 at the time of the requests, categories of information identified as likely to be relevant to the user, and the user's behavior (e.g., user appeared to use the information, user performed follow-up manual search query with defined parameters, etc.) with respect to information provided by the mobile device 202. The user behavior data stored in the user behavior data repository 242 can indicate whether a user found the identified category of information to be relevant given the mobile device's 202 current context.

For example, if the user is provided with a list of nearby restaurants (e.g., category regarding entities located geographically near the device's current geographic location) in response to a parameterless search query request and the mobile device 202 travels to one of the restaurants, then the associated user behavior data can indicate that the user found the identified category to be relevant given the device's context. In another example, if the user is provided with the list of nearby restaurants and the user immediately opens a calendar application to locate information for an upcoming meeting, then the associated user behavior can indicate that the user found the identified category to not be relevant (e.g., the user wanted calendar information instead of restaurant information).

The category identification unit 238 can use user behavior data from the user behavior data repository 242 to identify a category of information that is likely to be relevant to the user. For example, the category identification unit 238 can attempt to identify previous contexts that are similar to a current context for the mobile device 202 to receive an indication regarding a category of information that is likely to be relevant to the user.

Using a category of information identified by the category identification unit 238, a result identification unit 244 can identify one or more results to a parameterless search query by inferring parameters for the parameterless search query and perform the search query. For example, if the category identification unit 238 identified a category of travel information, the result identification unit 244 can determine specific parameters related to travel that are likely to be relevant to the user. For instance, the result identification unit 244 may determine that the user is likely to be interested in traffic condition for the user's commute to work. Like the category identification unit 238, the result identification unit 244 can use user behavior data from the user behavior data repository 242 to assist in determining specific parameters that are likely to be relevant to the user.

As described above with regard to FIG. 1, the search query can be performed local and/or remote to the mobile computing device 202. For instance, in implementations where a calendar application is implemented locally on the mobile computing device 202, the search query can be performed locally on the mobile computing device 202 (e.g., querying the calendar unit 230 for relevant calendar information stored in the calendar data repository 232). Additionally, the mobile computing device 202 can determine its current context and provide results to a parameterless search query as a standalone device (e.g., without interacting with a remote server system over a network). In another example, in implementations where a calendar data for a calendar application is provided on a remote server system, the mobile computing device 202 can interact with the remote server system to access the relevant calendar information.

Parameters for more than one search query can be generated by the result identification unit 244 in response to receiving a request for a parameterless search query. In such implementations, the result identification unit 244 can receive results for each of the search queries. For instance, the result identification unit 244 may identify that a user is likely to be interested in current traffic information and a recent update to a blog that the user frequently reads. The result identification unit 244 can submit search queries for both pieces of information and provide results for both search queries to a user of the mobile computing device 202. It may be possible to submit a single search query for two or more distinct pieces of information. However, when the two or more distinct pieces of information are maintained by different data sources, it may be more practical to generate separate search queries, as described above.

An output subsystem 246 of the mobile computing device 202 can provide results obtained by the result identification unit 244 to a user of the device 202. The output subsystem 246 can include a variety of output devices, such as a display 248a (e.g., a liquid crystal display (LCD), a touchscreen), a projector 248a (e.g., an image projector capable of projecting an image external to the device 202), a speaker 248c, a headphone jack 248d, etc. The network interface 208 can also be part of the output subsystem 246 and may be configured to provide the results obtained by the result identification unit 244 (e.g., transmit results to BLUETOOTH headset).

Referring to FIG. 2A, the mobile computing device 202 can wirelessly communicate with wireless transmitter 250 (e.g., a cellular network transceiver, a wireless network router, etc.) and obtain access to a network 252 (e.g., the Internet, PSTN, a cellular network, a local area network (LAN), a virtual private network (VPN), etc.). Through the network 252, the mobile computing device 202 can be in communication with a mobile device server system 254 (one or more networked server computers), which can be configured to provide mobile device related services and data to the mobile device 202 (e.g., provide calendar data, email data, connect telephone calls to other telephones, etc.).

The mobile device 202 can also be in communication with one or more information server systems 256 over the network 252. Information server systems 256 can be server systems that provide information that may be relevant to a user's parameterless search query. For instance, a information server systems 256 can provide current traffic conditions, a weather forecast, and information regarding businesses located near the current geographic location for the mobile device 202.

Figure 3:
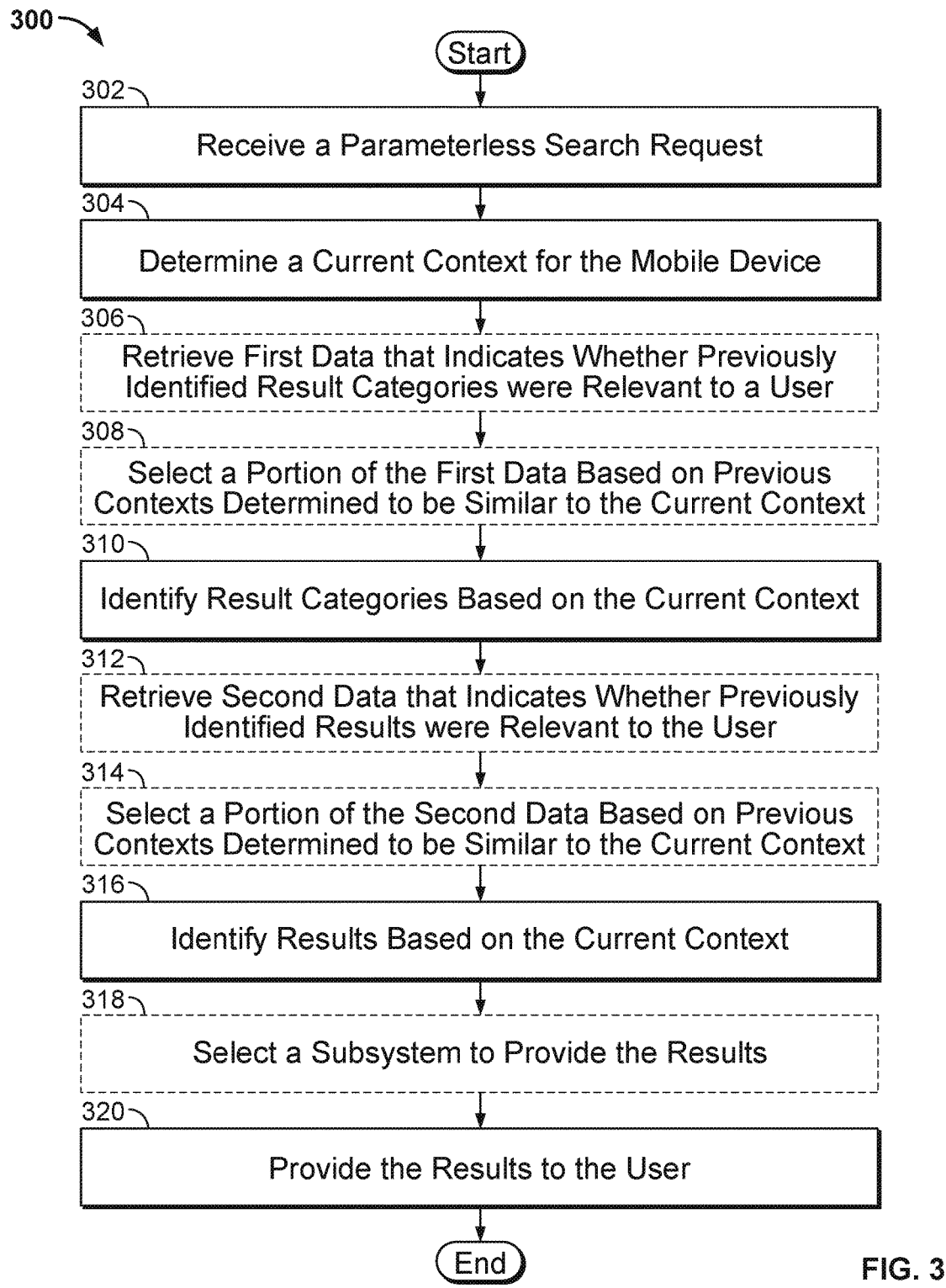
FIG. 3 is a flowchart of an example technique for providing results to parameterless search queries on a mobile computing device.

FIG. 3 is a flowchart of an example technique 300 for providing results to parameterless search queries on a mobile computing device. The example technique 300 can be performed by any of a variety of mobile computing devices, such as the mobile computing device 102 described above with regard to FIG. 1 and/or the mobile computing device 202 described above with regard to FIGS. 2A-B.

The technique 300 starts at step 302 by receiving a parameterless search request. For example, the mobile computing device 102 is described above with regard to FIG. 1 as receiving input 106 that indicates a request for a parameterless search query. As described with regard to the input parser 210 with regard to FIG. 2B, a variety of inputs (e.g., touch, action, voice, etc.) can be configured to indicate a request for a parameterless search query.

In response to receiving a parameterless search request, a current context for the mobile device can be determined (step 304). For example, a mobile device context determination unit 214 can determine a current context for the mobile device 202 using the context monitoring units 216-236.

In some implementations, first data that indicates whether previously identified result categories were relevant to a user are retrieved (step 306). For example, the category identification unit 238 described above with regard to FIG. 2B can retrieve user behavior data from the user behavior data repository 242 to determine which previously identified categories of information were relevant to the user. Portion of the first data can be selected based upon previous contexts determined to be similar to the current context for the mobile device (step 308). For example, user behavior data associated with contexts that are similar to the current context can be retrieved from the user behavior data repository 242.

Result categories can be identified based upon the current context for the mobile device (step 310). For example, given the context 110 determined with regard to the example depicted in FIG. 1, a travel category of identified as being likely to be relevant to the user of the mobile device 102 (e.g., the device is located at home on Monday at 8:00 am and the device habitually travels from home to work on Monday mornings at 8:05 am).

In some implementations, second data that indicates whether previously identified results were relevant to the user can be retrieved (step 312). For example, a result identification unit 244 can access user behavior data from the user behavior data repository 242 to determine which previously provided results the user of the mobile device 202 found to be relevant given the current context of the device. Portions of the second data can be selected based on previous contexts determined to be similar to the current context (step 314). For instance, the result identification unit 244 can select the user behavior data that is associated with previous contexts that are similar to the current context for the mobile computing device 202.

Results can be identified for the parameterless search request based upon the current context (step 316). For example, the result identification unit 244 can infer parameters for the parameterless search request based upon the current context of the mobile device 202 and use the inferred parameters to identify results that are likely to be relevant to the user of the mobile device. Results can be identified locally and/or remotely from the mobile device. For instance, if the mobile device 202 infers that a parameterless search request refers to a user's upcoming schedule, the mobile computing device 202 can access the calendar unit 230 locally to obtain the schedule information. The mobile device 202 is capable of determining its current context and providing results to a parameterless search request as a standalone device (e.g., without being connected to other devices over a network).

In some implementations, a subsystem can be selected for providing the results (step 318). For example, one or more of the output devices 248a-d of the output subsystem 246 for the mobile computing device 202 can be selected to provide the identified results to the user. The subsystem can be selected based upon a variety for factors, such as the manner in which the input indicating a request for a parameterless search was received (e.g., verbal input, shaking the device, etc.) and the current context for the mobile device. For instance, if the request for parameterless search is received as a verbal request, then the selected subsystem can be an audio output (e.g., the speaker 248c). In another example, if the current context indicates that the user may be in a location where audio output is undesired (e.g., user is in a library), then the selected subsystem can provide a visual output (e.g., the display 248a).

The results are provided to the user (step 320). A response from the user with regard to the provided results can be recorded by a mobile computing device as user behavior data and used to improve the results provided in response to future parameterless search requests. For example, if the user is provided with a recent update to a blog that the user frequently reads and the user sends a link to the updated blog posting to his/her friends, the user sending the link can be recorded as user behavior data in the user behavior data repository 242 of the mobile computing device 202 and used to provide results to future parameterless search requests.

Figure 4:
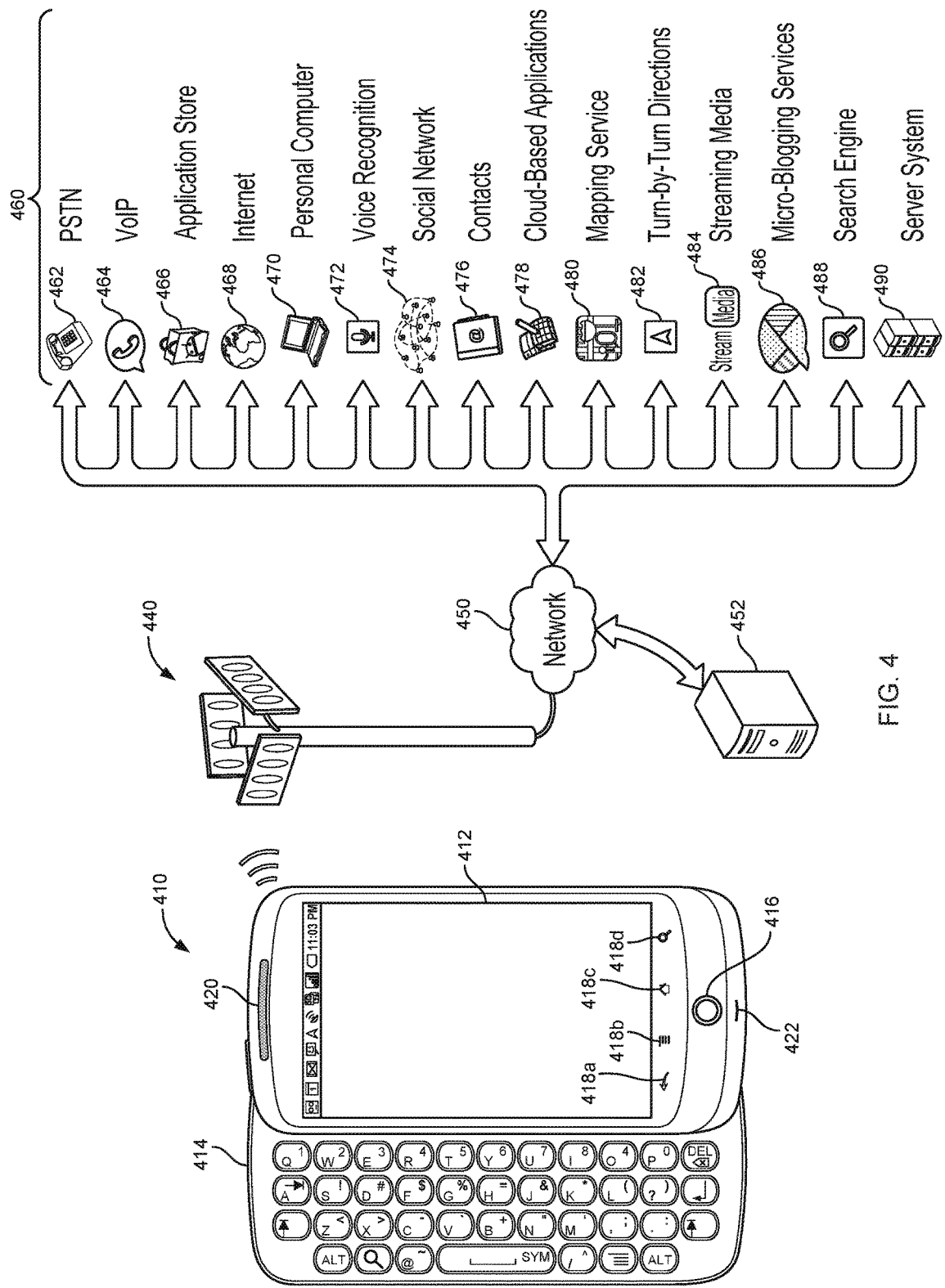
FIG. 4 is a conceptual diagram of a system that may be used to implement the techniques, systems, mechanisms, and methods described in this document.

FIG. 4 is a conceptual diagram of a system that may be used to implement the techniques, systems, mechanisms, and methods described in this document. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMO-LED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-4', '*', and '#.' The keyboard 414 receives input when a user physically contacts or depresses a keyboard key. User manipulation of a trackball 416 or interaction with a track-pad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile computing device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite map images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 5:
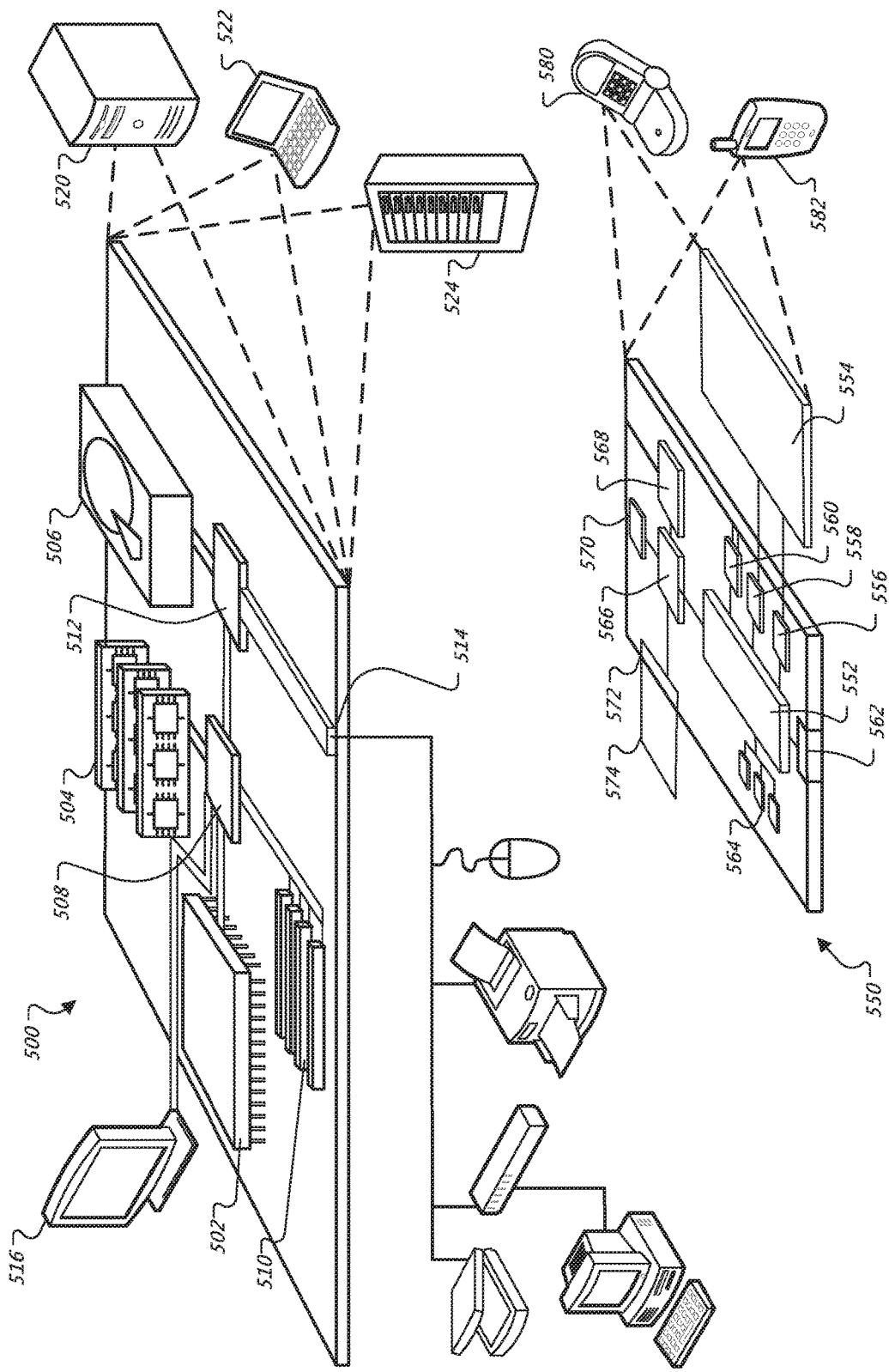
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing results to parameterless search queries on a mobile computing device may be used. In addition, the logic flows depicted in the figures do not require the particular order shown, or sequential order, to achieve desirable results. Other steps may be provided, or steps may be eliminated, from the described flows, and other components may be added to, or removed from, the described systems.

Accordingly, other implementations are within the scope of the following claims.

What is claimed is:

1. A method comprising:
   determining, by a computing system and based at least in part on information included in at least one electronic communication associated with a user of a mobile computing device, a context of the mobile computing device;
   responsive to determining the context, executing, by a computing system, based at least in part on the context of the mobile computing device, an inferred parameter query to identify one or more results determined to be relevant to the user of the mobile computing device; and
   sending, by the computing system, to the mobile computing device, the one or more results.

2. The method of claim 1, wherein determining the context of the mobile computing device is responsive to receiving a search request.

3. The method of claim 1, wherein the least one electronic communication includes at least one of email associated with the user of the mobile computing device, text messages associated with the user of the mobile computing device, or calendar information associated with the user of the mobile computing device.

4. The method of claim 1, wherein the context is further determined based at least in part on a current geographic location of the mobile computing device, and wherein the one or more results include information regarding one or more entities located within a threshold distance of the current geographic location of the mobile computing device.

5. The method of claim 1, wherein the at least one electronic communication includes one or more calendar appointments associated with the user, the method further comprising:
   responsive to determining that at least one of the one or more calendar appointments occur within a threshold period of time of a current time of day and a current date, identifying, by the computing system, information regarding the at least one of the one or more calendar appointments, where the one or more results include the information regarding the at least one of the one or more calendar appointments.

6. The method of claim 1, wherein the context further includes a recent activity of the user on the mobile computing device, the method further comprising:
   responsive to determining that information associated with at least a portion of the recent activity of the user has been updated since the user last engaged in the portion of the recent activity, identifying, by the computing system, the information associated with at least the portion of the recent activity of the user, wherein the one or more results includes the information associated with at least the portion of the recent activity of the user.

7. The method of claim 1, further comprising:
   identifying, by the computing system, based at least in part on the context of the mobile computing device, one or more result categories likely to be relevant to the user of the mobile computing device, wherein the one or more results are associated with the one or more result categories;
   receiving, by the computing system, an indication of whether the user considered the one or more result categories to be relevant;
   selecting, by the computing system, a portion of the one or more results associated with previous contexts of the mobile computing device, the previous contexts being determined to have a threshold degree of similarity to the context of the mobile computing device; and
   identifying, by the computing system, based at least in part on the portion of the one or more results associated with the previous contexts, the one or more result categories.

8. The method of claim 1, further comprising:
   retrieving, by the computing system, data that indicates whether the user considered previously identified results to be relevant, the data being associated with one or more previous contexts of the mobile computing device; and
   selecting, by the computing system, a portion of the retrieved data associated with a portion of the previous contexts of the mobile computing device determined to have a threshold degree of similarity to the context of the mobile computing device;
   wherein the one or more results are identified based on the selected portion of the retrieved data.

9. The method of claim 1, further comprising:
   receiving, by the computing system, a search request from the mobile computing device in response to the mobile computing device receiving an input in a manner; and
   selecting, by the computing system, based at least in part on the search request and the manner of the input, a subsystem of the mobile computing device to use for providing the one or more results to the user, wherein the one or more results are provided using the selected subsystem of the mobile computing device.

10. The method of claim 1, wherein the computing system is remote from the mobile computing device.

11. The method of claim 1, wherein the computing system comprises the mobile computing device.

12. A computing system comprising:
    a context determination unit that determines, based on information about at least one electronic communication associated with a user of a mobile computing device, a context of the mobile computing device;
    a result identification unit that, in response to the context determination unit determining the context, executes, based at least in part on the context of the mobile computing device, an inferred parameter query to identify one or more results determined to be relevant to the user of the mobile computing device; and
    an output subsystem that provides the one or more results to the mobile computing device.

13. The computing system of claim 12, further comprising:
    a data repository that stores user behavior data,
    wherein the result identification unit retrieves, from the data repository, data that indicates whether the user considered previously identified results identified to be relevant, the data being associated with previous contexts of the mobile computing device, and selects a portion of the retrieved data associated with a portion of the previous contexts of the mobile computing device determined to have a threshold degree of similarity to the context of the mobile computing device,
    wherein the one or more results are identified based on the selected portion of the retrieved data.

14. The computing system of claim 12,
wherein the context determination unit receives a current geographic location of the mobile computing device and determines, based at least in part on the current geographic location of the mobile computing device, the context, and
wherein the one or more results include information regarding one or more entities located within a threshold distance of the current geographic location of the mobile computing device.

15. The computing system of claim 12, wherein the context determination unit receives an indication of one or more calendar appointments associated with the user and, responsive to determining that at least one of the one or more calendar appointments occur within a threshold period of time of a current time of day and a current date, identifies information regarding the at least one of the one or more calendar appointments, where the one or more results include the information regarding the at least one of the one or more calendar appointments.

16. The computing system of claim 12, wherein the context determination unit receives an indication of a recent activity of the user on the mobile computing device, and, responsive to determining that information associated with at least a portion of the recent activity of the user has been updated since the user last engaged in the portion of the recent activity, identifies the information associated with at least the portion of the recent activity of the user, wherein the one or more results includes the information associated with at least the portion of the recent activity of the user.

17. The computing system of claim 12, wherein the least one electronic communication includes at least one of email associated with the user of the mobile computing device, text messages associated with the user of the mobile computing device, text messages associated with the user of the mobile computing device, or calendar information associated with the user of the mobile computing device.

18. A computing device comprising:
a context determination unit that determines, based at least in part on information including in at least one electronic communication associated with a user of the computing device, a context of the computing device; and
a network interface that sends the context of the computing device to a remote server system and receives, from the remote server system, one or more results of an inferred parameter query, the one or more results being determined to be relevant to the user of the computing device and being identified based at least in part on the context of the computing device.

19. The computing device of claim 18, further comprising:
an activity monitor unit that provides at least one of an indication of recent user activity on the computing device or habitual user activity on the computing device,
wherein the context determination unit determines, based at least in part on the indication of the recent user activity on the computing device or the indication of the habitual user activity on the computing device, the context of the computing device.

20. The computing device of claim 18, further comprising:
a calendar unit that provides an indication of appointment for a user of the computing device;
wherein the context determination unit determines, based at least in part on the indication of the appointments for the user, the context of the computing device.

* * * * *